United States Patent Office 2,874,918
Patented Feb. 24, 1959

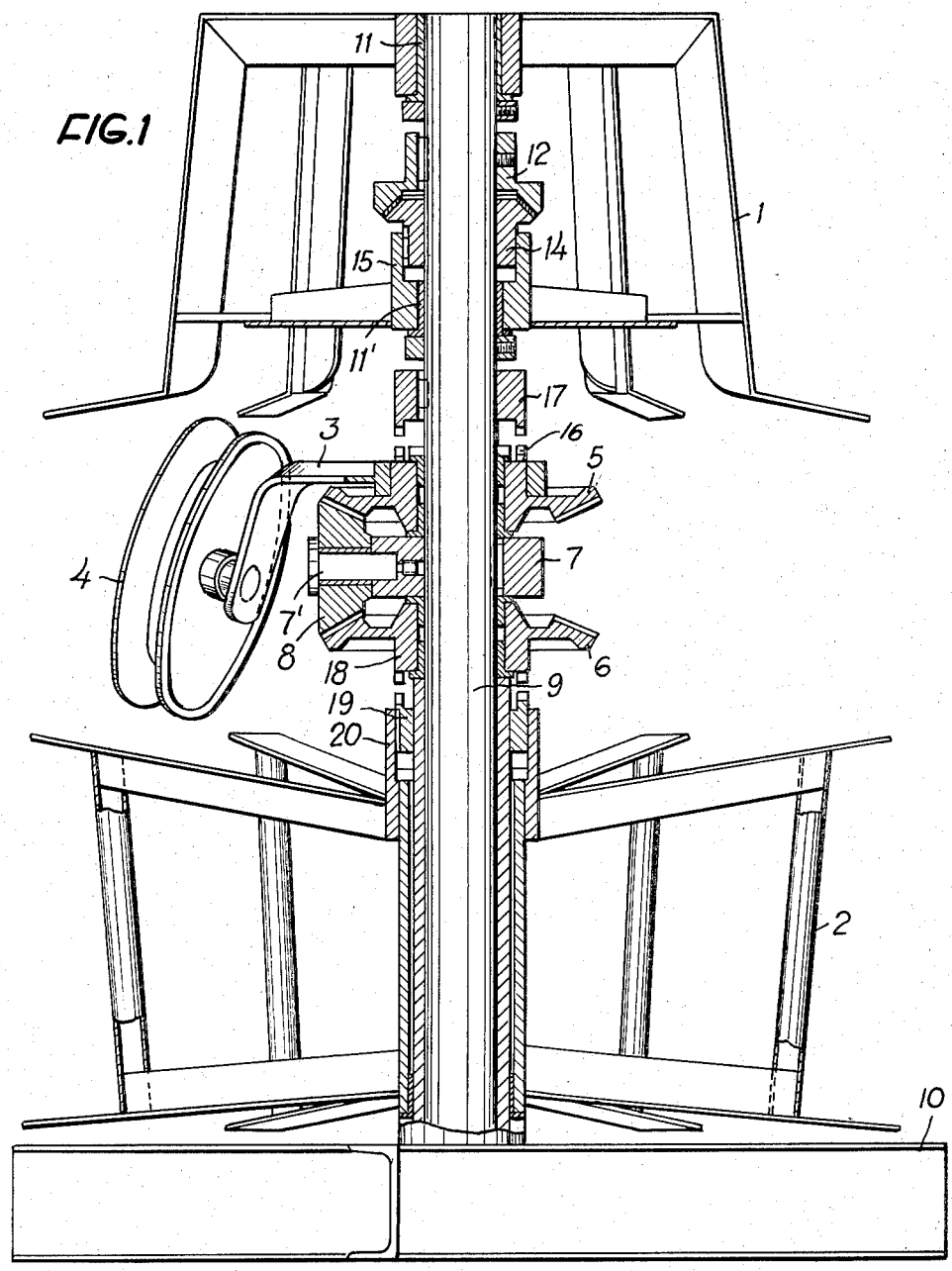

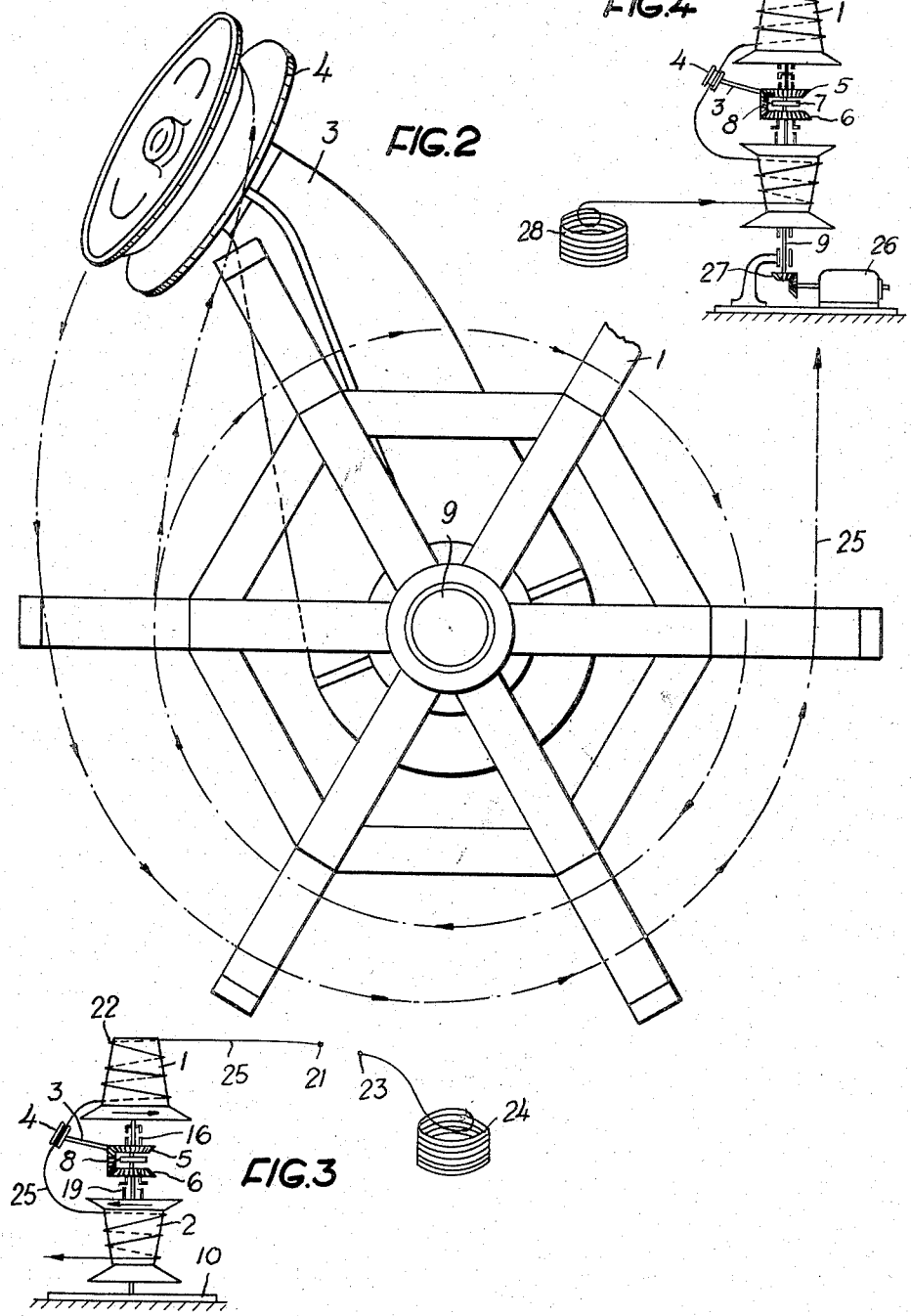

2,874,918

WIRE REELING MECHANISM

Sven Ingemar Steiber, Solna, Sweden

Application July 18, 1955, Serial No. 522,613

Claims priority, application Sweden July 24, 1954

4 Claims. (Cl. 242—82)

The present invention relates to mechanisms for continuously reeling wire and the like.

One object of the invention is to provide a suitable mechanism, by means of which it shall be possible to join the wire while the same is being reeled out or on, whereby a further wire bundle may be applied or removed, without the machinery having to be stopped.

A further object of the invention is to provide coupling means suitable for reeling mechanism with a reel drum and a storage drum whereby the storage drum can be connected with or disconnected from a stationary or rotatable shaft.

A still further object of the invention is to provide a combined gear and coupling device for reeling mechanisms for wire and the like enabling operation of a winding member for accumulating wire on a storage drum of the reeling mechanism.

Other objects of the invention will appear as the description proceeds.

To the accomplishment of the foregoing and related ends, the invention comprises the features hereinafter described more in detail and particularly pointed out in the claims, the following description, and the accompanying drawing setting forth certain illustrative embodiments of the invention, these being indicative, however, of but a few of the various ways in which the principle of the invention may be employed.

In the accompanying drawing:

Fig. 1 is an axial section of a reeling-out mechanism according to the invention illustrating the principal parts of the mechanism, Fig. 2 is a horizontal view of the mechanism shown in Fig. 1, Fig. 3 is a diagrammatic elevation of the embodiment according to Fig. 1 to elucidate the process of joining a wire of a removed reel to the wire to be taken up on a reel drum, and Fig. 4 is a view similar to Fig. 3 but illustrating a modification.

In the embodiments shown, the mechanism comprises a reel drum 1, a storage drum 2, a winding member in the form of an arm 3 with a roller 4 mounted thereon, and a differential gearing 5, 6, 7, 8, all of these principal parts being arranged on a vertical shaft 9 secured onto a bottom frame 10. The reel drum 1 is carried on the shaft 9 by means of a pair of combined thrust and radial bearings 11, 11' and may be locked to the shaft or braked thereagainst by means of a friction coupling, the one half 12 of which is splined onto the shaft, whereas its other coupling half 14, which is rotatably and axially displaceable on the shaft, is non-rotatably coupled to a hub sleeve 15 on the reel drum. The arm 3 of the winding member is secured to the hub of a gear wheel 5 of the differential gearing mounted on the shaft 9, and said gear wheel may be locked to the shaft by means of a claw coupling, the one half 16 of which is formed on the hub of the gear wheel 5 and the other half 17 of which is displaceably but non-rotatably arranged on the shaft 9.

The differential gearing comprises, in addition to the bevel gear 5, a planet wheel 8 mounted on a carrier 7 splined onto the shaft 9 and provided with a radial stub shaft 7' for the planet wheel, and a bevel gear 6 rotatably mounted on the shaft 9. The hub of this gear wheel forms the one coupling half 18 of a claw coupling, the other coupling half 19 of which is axially displaceable and locked against rotary movements in a hub sleeve 20 on the storage drum 2.

In reeling off a wire bundle laid on the reel drum the wire 25 runs, as shown in Figs. 2 and 3, over the roller 4 on the arm 3 of the winding member and thence over the storage drum 2, whereon a certain quantity of wire is assumed to be stored. It should be noted in this connection that the wire is wound onto the latter drum in a direction opposed to that on the reeling drum. The wire is drawn off the storage drum with the requisite force toward a reeling-on place, such as a wire drawing machine. If the arm 3 is then locked onto the shaft 9, which is effected by the coupling 16, 17 being thrown in, the wire will be reeled off the reel drum 1 to the same extent to which it is wound off and onto the storage drum 2. If the drums are taken to be of the same size, the same number of turns of wire will then be left on the storage drum as was the case when the reeling-off operation commenced.

Now, if the wire bundle commences to run out on the reel drum and another wire bundle is to be laid on, the end 21 of the wire on the laid-on bundle 22 is first to be joined, that is to say, to be welded to the beginning 23 of the wire of the other bundle 24, Fig. 3. The reel drum is then stopped and locked to the shaft 9 by means of the coupling 12, 14, which was previously used only to brake the reel drum for the obtainment of a suitable wire tension. When the reel drum is locked, the pull in the wire will bring about a revolving movement of the arm 3 about the shaft 9, so that the roller 4 will revolve about the latter and wind off the lowermost turns from the reel drum 1 while winding wire onto the storage drum 2 at the same time. While this is going on, the welding together of the wire ends 21 and 23 may be done, whereupon the new wire bundle 24 may be laid on the reel drum.

The reeling-off operation may then continue as ordinarily. To begin with, the coupling 14 is then operated so as not to exert any locking but only a braking effect on the reel drum 1. Furthermore, the coupling 17, 16 is thrown in, so that the arm 3 will be locked to the shaft 9 to become stationary. After that, the roller 4 only serves as a guide roller, and at the pull in the part of the wire 25 running off the drum 2 the drums 1, 2 will rotate at the same angular speed but in opposite directions. The whole of the time the same quantity of wire will be wound onto the storage drum as is being wound off, so that a certain reserve will be left on the same.

When a wire storage is to be laid onto the storage drum 2, the coupling 16, 17 is disengaged by the coupling half 17 being displaced upwardly, besides which the coupling 18, 19 is thrown into engagement by an upward displacement of the coupling half 19. Hereby the differential gearing will be coupled to the storage drum 2. The wire is laid manually by a few turns about the storage drum and is then secured to the take-up station (such as a wire drawing machine). At the subsequent pull in the wire part running off the storage drum 2 this drum will rotate so as to entrain the gear wheel 6 through the coupling 18, 19, said gear wheel driving the gear wheel 5 over the intermediate wheel 8 in the opposite direction but at the same angular speed. The arm 3 with the roller 4 is entrained in the latter movement and thus turns about the shaft 9 in a direction opposed to that of the storage drum 2, wire being then wound onto this drum. This wire is taken off the reel drum 1, which now runs freely on the shaft 9 and is compelled by the pull in the wire to rotate at a speed such as to deliver wire both for the storage on the drum 2 and for the supply to the take-up station. With the same diameter of the drums 1 and 2, the reel drum 1 will then rotate approximately twice as rapidly as the storage drum 2.

The operation of the various couplings comprised in the device is carried into effect by means of arbitrary suitable operating members. A simple operating contrivance may consist of a rod which is axially displaceable in a bore in the shaft 9 and provided with radial pins or the like, which may be brought into engagement through slits in the shaft, or which are connected to corresponding movable coupling halves.

In the preceding detailed description, the device has been indicated as a take-off device, but may also, with a slight modification, be used as a take-up device for wire with the maintenance of the advantages of the arrangement described, inasmuch as the upper drum can be stopped when a suitable quantity of wire has been reeled on. The wire bundle reeled on may thus be lifted off, without the machine having to be stopped in its entirety, and the wire supplied to the reeling device, while the reeling drum is standing still, is then wound onto the storage drum. In this case, the shaft will not be stationary but is driven mechanically by some suitable driving means as indicated in Fig. 4, in which 26 denotes a driving motor operating the shaft by a gear 27, and 28 is a reel of wire, from which the wire is to be taken up on the reeling drum 1 while passing the storage drum 2 and the winding member 3, 4 which may be operated by the differential gearing 5, 6, 7, 8. Coupling means analogous to those described in conjunction with Figs. 1–3 may also be included in the modified form of the invention.

What I claim is:

1. Reeling mechanism for wire comprising a shaft, a reel drum mounted for rotation about said shaft and adapted to receive the wire, means for coupling said reeling drum to the shaft, a wire storage drum mounted for rotation about the shaft, a winding member for transmission of the wire between said drums, the wire being adapted to run in opposite directions on the drums and from one drum over the winding member to the other drum, gearing means for operation of the winding member, and coupling means to couple said gearing means to the storage drum to accomplish rotation of the winding member about the shaft at a greater rotational speed than that of the storage drum and thus to enable accumulation of wire on said drum as a result of the rotation of the winding member.

2. A combined gear and coupling device comprising in combination with a reel drum and a storage drum on a shaft of a reeling mechanism, a differential gearing having two gear wheels rotatably mounted on the shaft and a planet gear wheel intermeshing with said two gear wheels and rotatable about an axle keyed to said shaft, a releasable coupling for connecting one of said gear wheels with the shaft and a further releasable coupling for connecting the other of said two gear wheels with the storage drum, said couplings each comprising coupling parts, one of which is carried by one of said two gear wheels.

3. A reeling mechanism comprising a rotary shaft, means to rotate said shaft, a reel drum mounted rotatably on said shaft, means to couple said reel drum to and from said shaft, a storage drum mounted rotatably on the shaft, gearing means on said shaft, a winding member operated from the shaft by means of said gearing means, and a releasable clutch to couple the gearing means to and from the storage drum.

4. A reeling mechanism for wire comprising a rotary shaft, a reel drum journaled on said shaft, a coupling adapted to couple the reel drum to and from said shaft, a storage drum for storing a certain quantity of the wire, a winding member mounted rotatably on said shaft, and means for coupling said winding members to the storage drum to enable rotation thereof in dependence on rotation of the storage drum for controlling the contents of wire on the storage drum and enabling continuous reeling also during stoppage of the reel drum.

References Cited in the file of this patent
UNITED STATES PATENTS

| | | |
|---|---|---|
| 1,187,827 | Gibbs | June 20, 1916 |
| 2,186,106 | Hargreaves et al. | Jan. 9, 1940 |
| 2,341,707 | Fornwald, Jr. | Feb. 15, 1944 |
| 2,629,564 | Bell | Feb. 24, 1953 |